(12) United States Patent
Li

(10) Patent No.: US 7,653,139 B2
(45) Date of Patent: Jan. 26, 2010

(54) BIT-LOADING METHOD AND SYSTEM FOR A DMT TRANSCEIVER

(75) Inventor: Linlin Li, Morganville, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 676 days.

(21) Appl. No.: 11/315,372

(22) Filed: Dec. 23, 2005

(65) Prior Publication Data

US 2007/0147530 A1    Jun. 28, 2007

(51) Int. Cl.
*H04B 1/38* (2006.01)
*H04L 27/28* (2006.01)

(52) U.S. Cl. .................................. 375/260; 375/219

(58) Field of Classification Search ............. 375/219, 375/222, 227, 259, 260
See application file for complete search history.

(56) References Cited

U.S. PATENT DOCUMENTS

| | | | |
|---|---|---|---|
| 5,479,447 A * | 12/1995 | Chow et al. | 375/260 |
| 6,516,027 B1 | 2/2003 | Kapoor et al. | |
| 6,704,367 B1 | 3/2004 | Wang et al. | |

* cited by examiner

*Primary Examiner*—David B Lugo
(74) *Attorney, Agent, or Firm*—Thomas, Kayden, Horstemeyer & Risley, LLP

(57) ABSTRACT

A system and method for a bit-loading algorithm based on an equal error rate principle for each sub-channel (bin) used in a discrete multi-tone modulation (DMT) system. The system and method of the present invention provides a bit-loading algorithm that provides long reach, high data rate and good error performance at a given condition. The bit-loading method and system depends on the Shannon channel capacity formula to allocate bits to different sub-channels. For DMT, the system and method tabulates different SNR GAP for different sub-channels (bins), and constructs a look-up table for the SNR GAP with different bits to achieve a better performance for the DMT system. In addition, Trellis coding across all the sub-channels are optionally supported in DMT, and likewise, the system and method creates another look-up table for variable coding gain provided for the Trellis coding gain in the bit-loading algorithm to further improve the system performance, knowing that the Trellis coding gain is different for different sub-channels with different bit allocation.

20 Claims, 8 Drawing Sheets

Distance spectrum for Un-Coded DMT

| Bits per bin | $\alpha_1$ at $d_1^2 = 4$ | $\beta_1$ at $d_1^2 = 4$ | $\alpha_2$ at $d_2^2 = 8$ | $\beta_2$ at $d_2^2 = 8$ | $\beta_1/b$ |
|---|---|---|---|---|---|
| 1 | 1 | 1 | 0 | 0 | 1 |
| 2 | 2 | 2 | 1 | 2 | 1 |
| 3 | 2 | 3 | 1.5 | 4 | 1 |
| 4 | 3 | 4 | 2.25 | 6 | 1 |
| 5 | 3.25 | 5.75 | 2.875 | 9.5 | 1.15 |
| 6 | 3.5 | 5.5 | 3.06 | 9.625 | 0.9167 |
| 7 | 3.625 | 6.5 | 3.3438 | 11.9375 | 0.9286 |
| 8 | 3.75 | 6.5 | 3.5156 | 12.1875 | 0.8125 |
| 9 | 3.8 | 7.06 | 3.6484 | 13.5313 | 0.7844 |
| 10 | 3.875 | 7.125 | 3.7539 | 13.8047 | 0.7125 |
| 11 | 3.9063 | 7.4375 | 3.8184 | 14.5508 | 0.6761 |

FIG. 5

SNR GAP for DMT

| Bits per bin | SNR gap at $P_s = 10^{-7}$ dB | SNR gap -9.8 dB | SNR gap at $P_b = 10^{-7}$ dB | SNR gap -9.5477 dB |
|---|---|---|---|---|
| 1 | 11.3087 | 1.5087 | 11.3087 | 1.761 |
| 2 | 9.758 | -0.042 | 9.5477 | 0 |
| 3 | 10.8494 | 1.0494 | 10.6392 | 1.0915 |
| 4 | 9.8766 | 0.0766 | 9.5477 | 0 |
| 5 | 9.7572 | -0.0428 | 9.4485 | -0.0992 |
| 6 | 9.9208 | 0.1208 | 9.5206 | -0.0271 |
| 7 | 9.7918 | -0.0082 | 9.3857 | -0.162 |
| 8 | 9.9405 | 0.1405 | 9.4828 | -0.0649 |
| 9 | 9.8061 | 0.0061 | 9.3336 | -0.2141 |
| 10 | 9.9498 | 0.1498 | 9.4412 | -0.1065 |
| 11 | 9.8139 | 0.0139 | 9.2866 | -0.2611 |

FIG. 6

Error Multiplicities For 4-D Symbols

| Bits per bin | Coded symbols/2D at MSED | Coded bits/2D at MSED | Coded bits/symbol at MSED | Un-coded symbols/2D | Un-coded bits/2D | Un-coded bits/symbol |
|---|---|---|---|---|---|---|
| 1 | 0.25 | 1 | 4 | 1 | 1 | 1 |
| 2 | 0.5 | 2 | 4 | 2 | 2 | 1 |
| 3 | 2.125 | 7 | 3.2941 | 2 | 3 | 1.5 |
| 4 | 4.5313 | 15.5 | 3.4207 | 3 | 4 | 1.3333 |
| 5 | 6.6328 | 30.8125 | 4.6455 | 3.25 | 5.75 | 1.7692 |
| 6 | 7.6894 | 33.4766 | 4.3536 | 3.5 | 5.5 | 1.5714 |
| 7 | 8.8404 | 45.666 | 5.1656 | 3.625 | 6.5 | 1.7931 |
| 8 | 9.6798 | 48.3467 | 4.9946 | 3.75 | 6.5 | 1.7333 |
| 9 | 10.2806 | 55.8679 | 5.4343 | 3.8 | 7.06 | 1.8579 |
| 10 | 10.7959 | 58.3215 | 5.4022 | 3.875 | 7.125 | 1.8387 |
| 11 | 11.1007 | 62.6226 | 5.6413 | 3.9063 | 7.4375 | 1.904 |

FIG. 7

| Bits per bin | SNR gap at $P_s = 10^{-7}$ (dB) | Nominal Coding gain (dB) | Effective Coding Gain (dB) | Coding Gain Difference With 2 bits/bin |
|---|---|---|---|---|
| 1 | 5.2881 | 6.0206 | 4.5206 | 0 |
| 2 | 8.2984 | 6.0206 | 4.5206 | 0 |
| 3 | 13.3253 | 5.7649 | 4.5206 | -0.2557 |
| 4 | 15.6901 | 5.6185 | 4.5206 | -0.4021 |
| 5 | 18.8302 | 5.5319 | 4.5206 | -0.4887 |
| 6 | 22.0249 | 5.4891 | 3.9891 | -0.5315 |
| 7 | 24.9737 | 5.45 | 3.95 | -0.5706 |
| 8 | 28.119 | 5.4292 | 3.9292 | -0.5914 |
| 9 | 31.0071 | 5.4107 | 3.9107 | -0.6099 |
| 10 | 34.1425 | 5.3974 | 3.8974 | -0.6232 |
| 11 | 37.0103 | 5.3874 | 3.8874 | -0.6232 |

SNR Requirements for Trellis-Coded Modulation

FIG. 8

BIT-LOADING METHOD AND SYSTEM FOR A DMT TRANSCEIVER

FIELD OF THE INVENTION

The invention relates generally to Discrete multi-tone (DMT) data communication system, and specifically, to systems and methods for bit-loading based on the equal error rate principle for each sub-channel used in a DMT system.

BACKGROUND OF THE INVENTION

High-bandwidth technologies which are prevalent today are frequently implemented on existing copper wire infrastructure that was intended for plain old telephones (POTS) communication. One such technology is Digital Subscriber Line (DSL). DSL comes in multiple variations such as ADSL, HDSL, IDSL, SDSL, RADSL and VDSL collectively known as xDSL. Asymmetric digital subscriber line (ADSL) allows users a higher data rate downstream (i.e. to the customer) than upstream (i.e. the service provider).

These high-bandwidth systems use multi-carrier modulation schemes such as Carrier-less Amplitude and Phase modulation (CAP) and Discrete Multi-tone (DMT) for wired media communication. The advantage of such schemes is that they are suited for high-bandwidth applications of 2 Mbps or higher upstream (subscriber to provider) and up to 8 Mbps downstream (provider to subscriber). DMT systems divide the spectrum above the 4-KHz voice frequency band into 256 narrow channels called sub-channels (sometimes referred to as DMT tones or bins. Each sub-channel is 4.3125 KHz wide. Quadrature amplitude modulation (QAM) is used for each sub-channel. Different numbers of bits may be allocated to different sub-channels, and sub-channels with a larger signal-to-noise ratio (SNR) typically carry more data while other sub-channels with a smaller SNR carry relatively less data. The process of determining which sub-channel should carry more or less data based on the SNR is termed bit-loading, bit-allocation, or bit-stuffing.

The Shannon formula for calculating the bit rate B for a QAM system in unit bandwidth is representation equation 1:

$$B = \log_2(1 + \text{coding\_gain} * \text{SNR}/\text{snr\_gap}) \quad (1)$$

where, SNR is the signal-to-noise ratio, coding_gain is the coding gain, snr_gap is the quantity used to determine the efficiency of a modulation or encoding scheme as compared to the ideal scheme.

DMT is a combination of many QAM sub-systems i, where i is an integer between 1 and the maximum. After the signals are transmitted through the channel, the signals are attenuated differently, thereby creating a different SNR_i for different sub-systems. After summing equations (1), N times for each sub-carrier a rate that can support a DMT system is achieved.

There are many different prior art methods for allocating bits to sub-channels (bins). In these algorithms, a common characteristic is that an equal error rate criterion and a single value of SNR-GAP is used to load bits in different sub-channels or "bins." One of those methods uses different signal-to-noise ratio (SNR) for different sub-systems and considers the influence of SNR GAP and coding gain. This method creates a pre-calculated look-up table (saved in memory) to compare the actual bit rate, and then a decision is made as to the number of bits the system can support. Such a method is disclosed in U.S. Pat. No. 6,516,027 to Kapoor et al. hereby incorporated by reference it its entirety. In addition, this method uses a symbol error rate for the bit-loading, instead of a bit error rate.

Another known bit-loading method determines a preliminary bit assignment for each sub-channel by optimizing a DMT system with N carriers for transmission over an additive white Gaussian channel, given an available bandwidth and assuming that all sub-channels are turned on. The sub-channels that receive negative bit assignments are excluded, and the procedure for determining the bit assignments is repeated until all the bit assignments are positive for the remaining turned-on sub-channels. Then, for a given bit error rate, the method arranges the power and data rate to optimize the DMT transmission bandwidth. Such a method is disclosed in U.S. Pat. No. 6,704,367 to Wang et al. hereby incorporated by reference in its entirety.

The two main requirements for implementing any bit-loading algorithm are simplicity and precision. For an un-coded, zero-margin system with a given bit, error rate (BER), the SNR GAP $\Gamma$ employed in the calculation of bits to be allocated to each sub-channel, is fixed to a given value in the existing algorithms. As shown in FIG. 1, a bit allocation method begins in step 110 with calculating the signal-to-noise ratio for a sub-channel. Then, in step 120, a common coding gain is added to the SNR. Next, in step 130, a common signal-to-noise (SNR) ratio gap is subtracted. Then, with the calculated information, the bits to be allocated to that sub-channel are calculated in step 140. Those steps are repeated for all the available DMT sub-channels, and the calculated bits to be allocated are added together in step 150, in order to achieve the total number of bits that can be allocated to the system as a whole in step 160. However, the bit rate calculated using a fixed SNR GAP and a fixed Trellis coding gain is inaccurate and cannot reflect the boundary effect, which is the difference between symbol error multiplicity, the bit error multiplicity and the constellation size. Other drawbacks also exist in current bit-loading methods. Therefore, there is a need for a method and system for attaining an improved bit-loading in discrete multi-tone modulation (DMT) data communication systems.

SUMMARY OF THE INVENTION

An object of the invention is to provide a method and system for allocating bits to a plurality of transmission sub-channels in a communication system.

In one embodiment of the present invention, a method and system for allocating bits to sub-channels (bins) in a discrete multi-tone modulation system is provided. The method and system according to this embodiment involves allocating bits to sub-channels with the signal-to-noise ratio gap (SNR GAP) as well the Trellis coding gain varying from one sub-channel to another, with a constellation size that varies from 1 to 15 bits per sub-channel in a DMT system (G.dmt.bis). The SNR gap and the Trellis coding gain for each sub-channel may vary, thereby, influencing the system performance, based on the relation between the symbol error multiplicity and bit error multiplicity. For un-coded DMT, it is readily known that for 1 bit per sub-channel the symbol error multiplicity at a minimum distance $d_{min}$ is about a ¼ of that for 15 bits per sub-channel. This translates to a difference of 0.4 dB of required signal-to-noise ratio (SNR) to support the required rate. Also, a symbol error multiplicity may correspond to a bit error rate ½ for 2 bits/sub-channel but to a bit error rate of 1/15 for 15 bits/sub-channel. This translates to a difference of 0.6 dB in SNR. Generally speaking, for both un-coded and coded systems, for a small constellation, each symbol contains few bits. Thus, when one symbol is in error, the bit errors will be few for small constellation. For a QAM system, this may not introduce a big problem because there is only one constellation. The bit error rate calculated from the symbol error rate will only have a constant difference and therefore the so will the SNR gap. However, in one DMT signal there are many constellations (in G.DMT, the constellations supported are from 2 bits to 15 bits per bin). The difference between symbol error multiplicity and bit error multiplicity will introduce varying SNR gap and this will eventually influence the optimality of the bit-loading. For the same reason, this problem exists in trellis coded DMT because the 4-D Trellis encoder and the Viterbi decoder are working on symbols too. One error event will introduce different bit errors depending on the constellation sizes. For the same reason, those problems exist in Trellis coded DMT because the 4-D Trellis encoder and the Viterbi decoder are working on symbols too. One error event will introduce different bit errors depending on constellation sizes. Therefore, the coding gain is influenced accordingly In another embodiment of the present invention, a method and system for allocating bits to sub-channels (bins) in a discrete multi-tone modulation system based on generating a constellation C by a lattice $\Lambda$ of N-dimension (in $Z^N$) and a finite boundary region $\mathfrak{R}$ (in $R^N$), where the constellation C=$\Lambda \cap \mathfrak{R}$ is provided. The method and system according to this embodiment indicates that the formation of this constellation generates a shaping gain for a DMT system compared with an infinite constellation. On the other hand, when the constellation C is formed from lattice $\Lambda$ and region $\mathfrak{R}$, it is the boundary effect that makes the DMT because in one DMT symbol there are many constellations with different sizes from many sub-channels. But for a QAM system, there is only one constellation and this influence of the coding gain on the optimality of the design is limited. For example, in the un-coded DMT system, for the 2 bits per bin case, there are only 4 symbol points and each point has only 2 nearest neighbors. This means that if one symbol is wrongly detected due to noise or crosstalk, this symbol is most possibly detected as one of the two nearest neighbors. The possibility of an error occurring will be larger than that for 2 bits per bin. The reason for this is the boundary effect when the constellation is formed. Generally speaking, for a small constellation, the percentage of inner points is small. Therefore, the boundary effect is obvious and the SNR gap is relatively small. On the other hand, for a large constellation, most of the points are inner ones and the boundary effect is relatively small. The averaged nearest neighbors are all different for different constellation sizes and there are many constellations in one DMT symbol (this is why the boundary effect is particularly important for DMT). As such the SNR GAP will be different for different constellation sizes. For the same reason, we know that for a system with Trellis coded modulation (TCM), the boundary effect will also cause coding gain differences which should be taken into consideration for optimal bit allocation.

In yet another embodiment of the present invention, a method and system for correctly allocating bits to sub-channels by utilizing two look-up channels is provided. In the method and system according to this embodiment one look-up table is tabulated for the coding gain and another one for the SNR GAP. For an un-coded DMT system, only one look-up table is generated for the SNR GAP, but in a coded DMT system, the two tables may be combined as one entity to further simplify the method and system for allocating bits to sub-channels.

The bit-loading systems and methods according to various embodiments of the present invention may be applied to any digital communication system with DMT modulation such as International Telecommunications Union (ITU) standards G.992.2, ITU G.992.3, etc., to increase the transmission rate or enhance the reach transmission distance with better error protection performance.

The accompanying drawings, which are incorporated in and constitute a part of this specification, illustrate various embodiments of the inventions and, together with the description, serve to explain the principles of the inventions.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which:

FIG. 5 is a tabulation of a distance spectrum for un-coded DMT according to at least one embodiment of the invention;

FIG. 6 is a tabulation of an SNR GAP for DMT according to at least one embodiment of the invention;

FIG. 7 is a tabulation of an error multiplicities for 4-D symbols according to at least one embodiment of the invention; and FIG. 8 is a tabulation of SNR requirement for Trellis Coded Modulation according to at least one embodiment of the invention.

DETAILED DESCRIPTION OF THE INVENTION

The following description is intended to convey a thorough understanding of the invention by providing a number of specific embodiments and details involving the structure and operation of a novel method and system of the present invention. It should be understood, however, that the present invention is not limited to these specific embodiments and details, which are provided for exemplary purposes only. It should be further understood that one possessing ordinary skill in the art, in light of known and methods and system, would appreciate the use of the invention for its intended purposes and benefits in any number of alternative embodiments, depending upon specific design and other needs.

Figure 1:
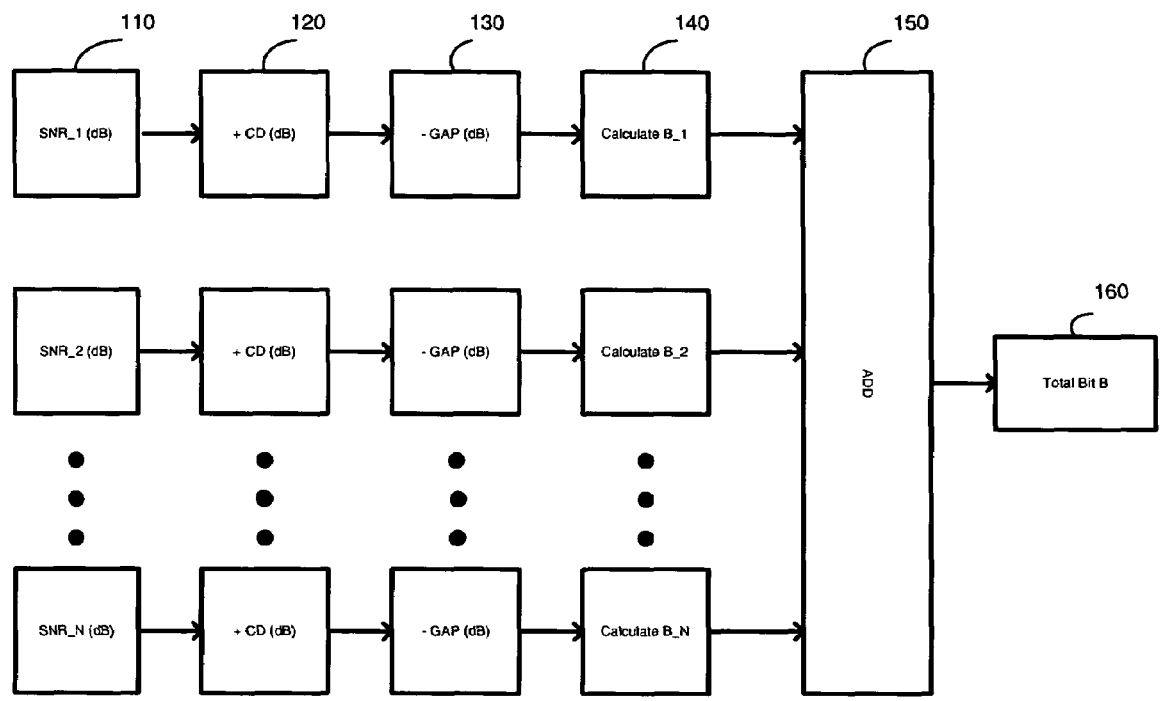
FIG. 1 is a prior art bit-loading calculation method for a DMT system.
Figure 2:
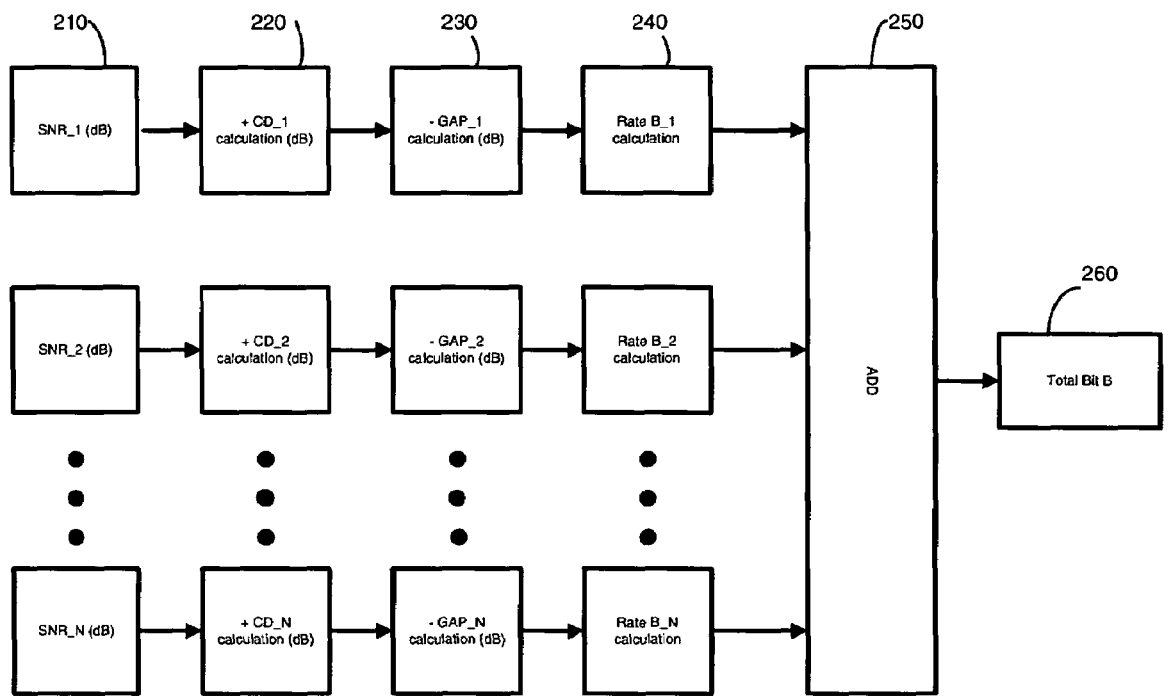
FIG. 2 is bit-loading method and system, according to at least one embodiment of the present invention.

FIG. 2 is bit-loading method and system according to at least one embodiment of the present invention. Conventional bit-loading algorithms are based on the Shannon channel capacity formula to calculate the bits that a discrete multitone modulation (DMT) system can support, and may be calculated using equation (2) as follows: b DMT=i .times. b i=i .times. log .function.(1+SNR i .times. C/M .times. .times. .GAMMA.) (2) where b.sub.DMT is the total bits that a DMT system may support, b.sub.i is the bits supported by the ith sub-channel, SNR.sub.i is the SNR in the ith sub-channel, C is the coding gain, the summation is over all the sub-channels used and M is the margin, an amount of additional signal-to-noise ratio in excess of the minimum required to achieve a given performance level for a particular type of modulation scheme with a particular SNR gap .GAMMA. Thus, for all the sub-channels used, the coding gain and the gap are common.

Reference is made to FIG. 2. In one embodiment of the present invention, a method and system for a bit-loading algorithm is disclosed, where the SNR gap and the coding gain varies and where both depend on the constellation size (or the bits supported), and the mapping method employed. Since DMT is a combination of different constellation sizes, the method and system for loading bits in sub-channels is calculated using equation (3) as follows: $b_{DMT} = \sum_i b_i = \sum_i \log(1 + SNR_i \times C_i/M \times \Gamma_i)$ (3) That is, the systems and methods according to the various embodiments of the present invention take into consideration a variable coding gain $C_{sub.i}$ and a variable SNR gap $\Gamma_{sub.i}$ for different sub-channels with different constellation sizes, as depicted in the steps 210, 220, 230, 240, 250, 260 shown in FIG. 2.

Another advantage of the systems and methods of the present invention is that bits are allocated to sub-channels or "bins" based on an equal error rate principle for each sub-channel in the DMT system. As a result, efficiency gains are realized because it is a "per sub-channel" analysis of the error rate, and it is iterative in the sense that a first guess leads to an error per sub-channel in the frequency domain, which is then refined only once leading to a final DMT symbol estimation.

Assuming equal and optimal system performance margin over all used sub-channels at an specified error rate, the probability of error (symbol error) in each sub-channel i, may be calculated by equation (4) as follows: $P_s = K(i)Q(d(i)/2\sigma)$ (4) where $K(i)$ is the nearest symbol neighbor for the ith sub-channel, $d(i)$ is the corresponding minimum distance, $\sigma$ is the standard deviation, and $\sigma^2$ is the 1-dimensional Additive White Gaussian Noise (AWGN) variance. Then the minimum is achieved when all sub-channels have the same error rate. In this way, any sub-channel will have an equal chance to have an error and the error probability is evenly distributed to each sub-channel. For a DMT with AWGN, the channel capacity for any sub-channel is calculated as follows: $b = \log_2(1 + SNR_c)$ (5) where $SNR_c$ is the received signal-to-noise ratio per 2-dimensions. In other words, the SNR required to support a given number of bits per sub-channel in this ideal case is: $SNR_c = 2^b - 1$ (6)

However, the actual SNR required to support a required rate is calculated from equation (4) to approximate for large SNR, specifically for the un-coded case, where there is an absence of an error-correction coding scheme involving the implementation of redundant bits and expanded bandwidth. AS such, the actual SNR may be calculated by equation (7) as follows:

$$SNR_r = A[Q^{-1}(P_b/K)]^2 \quad (7)$$

where A is a number related to the size and shape of the constellation, $P_b$ is the required bit error rate, Q is the error function, and K is the nearest symbol neighbor. The SNR GAP, the difference between the actual SNR and the received signal SNR, may be calculated by equation (8) as follows:

$$\Gamma = SNR_r - SNR_c = SNR_r - (2^b - 1)(dB) \quad (8)$$

The SNR GAP $\Gamma$ is a factor that represents the effects of the chosen coding scheme, the target bit error rate (BER), and the desired minimum system performance margin. In particular, the SNR GAP effectively estimates the difference between channel capacity and the actual capacity usage of the transmission scheme. And from (8) above, $\Gamma$ is not constant in DMT. Rather, it is a parameter that depends on the shape and the number of bits allocated to each sub-channel.

Figure 3:
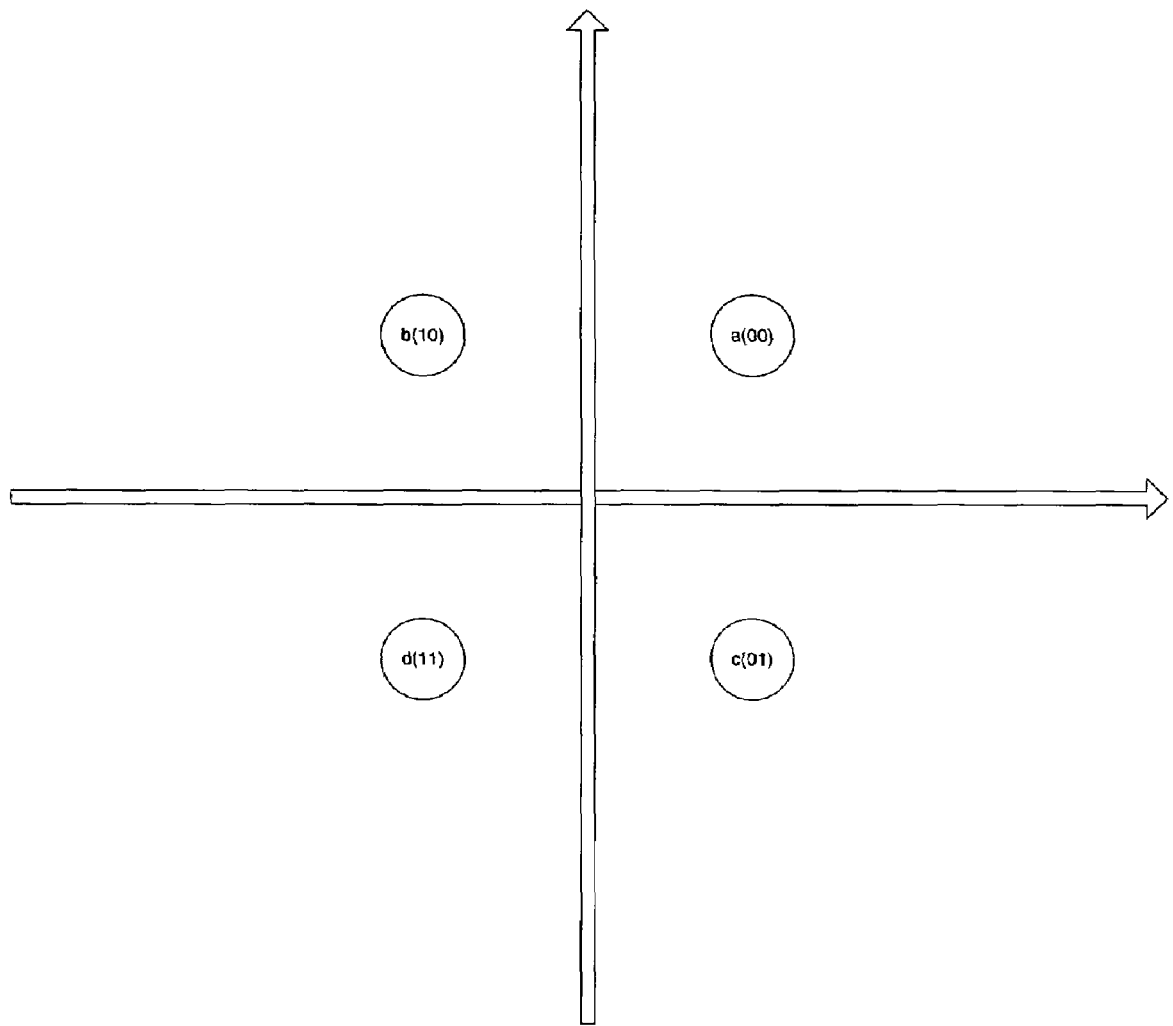
FIG. 3 is a QAM signal with a 4-point signal constellation, according to at least one embodiment of the invention.
Figure 4:
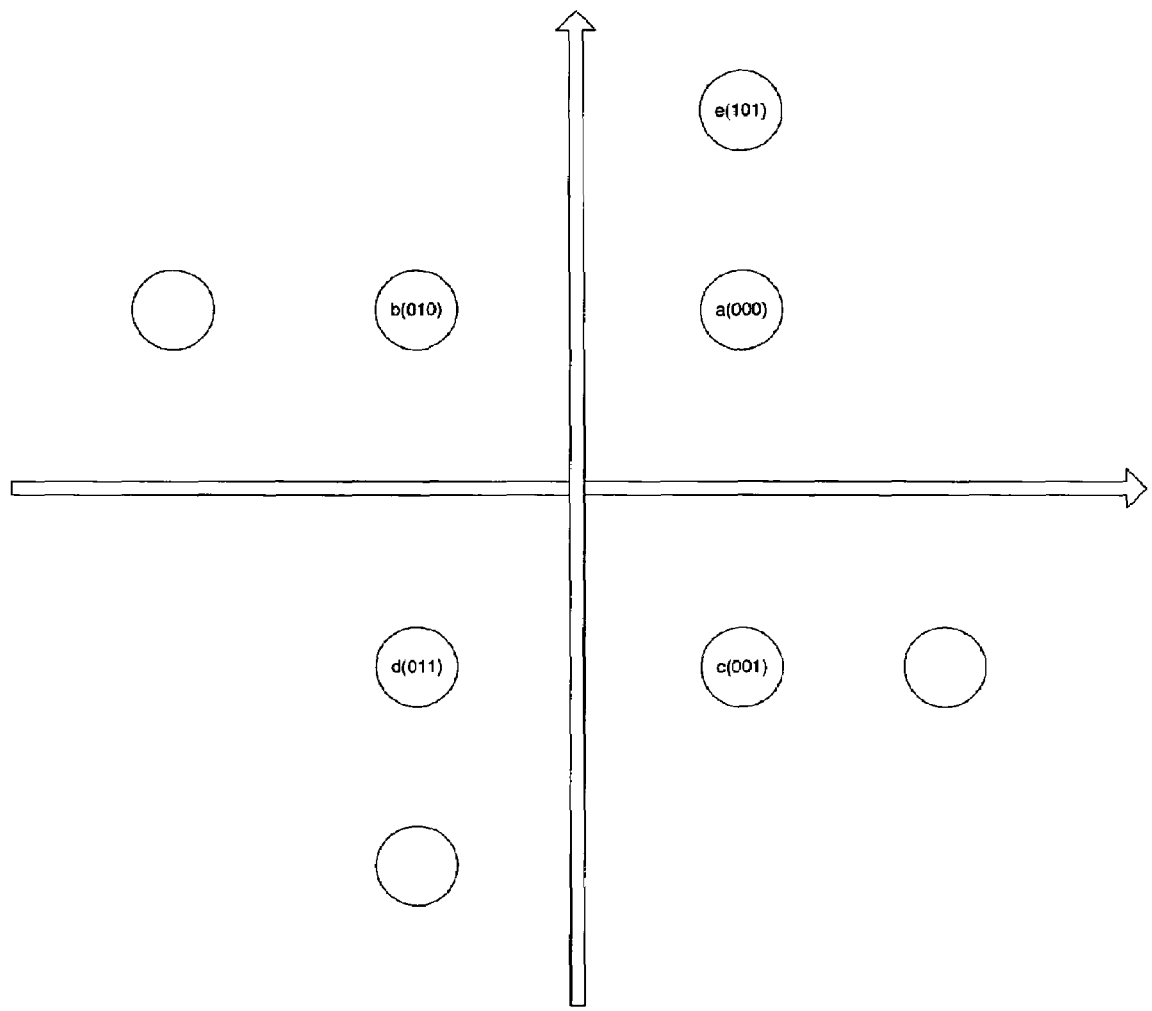
FIG. 4 is a QAM signal constellation of 8 points, according to at least one embodiment of the invention.

Quadrature Amplitude Modulation (QAM) is the encoding of information into a carrier wave by varying the amplitude of both the carrier wave and a quadrature carrier which is 90.degree. out of phase with the main carrier in accordance with two input signals. QAM takes advantage of the fact that the greater the number of symbols, the greater the efficiency of the system. Occupied bandwidth is determined, mostly, by the symbol rate. So the more bits (the fundamental information units) per symbol, the higher the efficiency. FIG. 3 is a QAM signal with a 4-point signal constellation according to at least one embodiment of the invention. FIG. 4 is a QAM signal constellation of 8 points according to at least one embodiment of the invention. The number of symbols required for a given system is $2^n$, where n is the number of bits per symbol. For a 16 QAM, n=4 and there are 16 symbols—each symbol representing four bits: 0000, 0001, 0010, etc. Symbol error probability is difficult to ascertain, therefore, a union bound technique is almost always used. The union bound is an upper bound on the symbol error probability at large SNRs (i.e. for good communication channels). For a QAM system in AWGN, the symbol error rate may be calculated using a union-bounded (upper limited by the sum of all the errors made to all the wrong decision at all different differences) as in equation (9) as follows: $P_s \leq \sum_{i=1}^{N} \alpha_i Q(d_i/2\sigma)$ (9) where $\alpha_{sub.i}$ is the average symbol error multiplicity for two constellation points $y_n$ and $y_m$ with squared distance $d_i^2$, and the Q function is the pair-wise error probability. From (9), it is obvious that for a large SNR with un-coded modulation, only the first few terms are important, which means a large enough minimum distance between the constellation points is required. For un-coded systems, only the first term (at most the first two) is of importance in the case of a large SNR. This is also true even for coded systems, for instance, in Trellis-coded modulation systems. However, for middle to low SNR, the optimization of the weight distribution needs to be considered. That means more terms in equation (9) are needed for the bit error rate calculation.

For applications such as DMT, it is the bit error rate $P_b$ that is of greater importance. Usually $P_b < P_s$ for a QAM signal with bits/sub-channel, where b>1. In this case, when a decoded symbol is in error, not all the corresponding bits are in error. The union bound for bit error rate $P_b$ is represented by equation (10) as follows:

$$P_b \leq \sum_{i=1}^{N} \beta_i Q(d_i/2\sigma)/b \quad (10)$$

Where $\beta_i$ is the average bit error multiplicity at distance $d_i$ and it is defined as $$\beta_i = \sum_n \sum_m Pr(y_m)\beta(m, n) \quad (11)$$

where $Pr(y_m)$ is the probability of constellation point $y_m$ and $$\beta(m, n) = \begin{cases} \{H(X(y_n), X(y_m)), d(y_m, y_n) = d_i \\ 0, \quad \text{otherwise} \end{cases} \quad (12)$$

H is a function returning the hamming distance between two b-tuples, $X(y_m)$ and $X(y_n)$ mapping to $y_m$ and $y_n$, according to the DMT standard.

In an embodiment of the present invention, and in reference to FIG. 5, a minimum distance $d_{min}$ of 2 for a QAM constellation is utilized, in order to show that only the first two terms of the distance spectrum is necessary for the BER calculation. The distance spectrum for un-coded DMT utilizing $d_{min}$ of two for a QAM constellation yields the squared distances and the corresponding symbol and bit multiplicities at those distances for the next reference (FIG. 6).

The union bound by its nature is a very loose bound, and to get a tight bound, some form of truncation has to be implemented. For the SNR range of interest in DMT which is greater than 14 dB for 2 bits per sub-channel in G.DMT or greater than 11 dB for 1 bit per sub-channel in G.dmt.bis for the un-coded case, only the first term in equation (10) is dominant due to the Q function and the large distances for other terms (the Q function will drop exponentially as the distance increases).

The contribution from the second term is far less than that from the first term for SNR larger than 10 dB. Therefore, the bit error rate is approximated by equation (13) as follows:

$$P_b = \beta_1 Q(d_{min}/2\sigma)/b \quad (13)$$

where $d_{min}$ is the minimum distance among the constellation points for a given constellation for the un-coded case.

Furthermore, the systems and methods of the present invention examine the bit error rate for the whole DMT system. If the ith sub-channel has a BER $P_{b,i}$ and can support $b_i$ bits, the contribution of this sub-channel to the total BER is $$b_i P_{b,i} / \sum_i b_i$$

where the sum is for all the sub-channels used. Thus, the BER for the DMT system is represented by equation (14) as follows:

$$P_{b,DMT} = \sum_i b_i P_{b,i} / \sum_i b_i \quad (14)$$

For an optimum system design, all sub-channels should perform with the same bit error rate, otherwise, the sub-channel with the highest bit error rate would dominate. For a DMT system, at least a bit error rate of $P_b=10^{-7}$ is required according to the DMT standards. In addition, the probability of a decoding error is reduced by incorporating Gray coding in the DMT signaling, a coding scheme where adjacent symbols differ by 1 digit. This type of coding is useful for reducing the bit error rate in the DMT system. Also the criterion of equal bit error rate is not the same as the criterion of equal symbol error rate for the DMT system design because of the difference between equations (9) and (10) (one symbol will typically introduce more than 1 bit error).

According to an embodiment of the present invention, and in accordance with FIG. 6, the SNR gap being related to different criteria, is calculated, and a table is created according to equation (8). Generally, the SNR Gap is calculated such that for $P_s=10^{-7}$, the SNR gap is 9.8 dB or for a $P_b=10^{-7}$, the SNR gap is 9.5477 dB, but actually, the 9.8 dB (according to the table, for a 2 bits per bin, the gap is actually 9.758 db) or the 9.5477 dB is only for the case of 2 bits per sub-channel, and not across all the DMT sub-channels having different bits. The gap is not a constant for all cases, especially for 1 bit per sub-channel and 3 bits per sub-channel. Instead, the gap depends on the bits supported by a constellation. This is one of the new results in this invention. Therefore, we can see that the channel capacity formula (5) and a single SNR GAP value (say 9.5477 dB) are not good for the system design. Instead, different values of the SNR GAP for the different bits supported by a sub-channel must be used.

For the coded case, the Trellis encoder/decoder in DMT comes from Wei's original 4D, 16 state, rate ⅔ trellis coded modulation scheme. The coded case shares many parameters with the un-coded case, but at the same time there are enough differences that may introduce difficulty in the performance evaluation for the DMT receiver. For example, in Wei's original code, if there is a requirement to transmit Q information bits per 2D in 1 symbol interval, 2Q+1 bits in one 4D constellation should be transmitted. In other words, in each symbol interval, transmitting (2Q+1)/2 bits per 2D (which may be fractional or integer) is possible. But in any case, the same bits in each symbol interval must be sent in a per 2D. Therefore, the coding gain may be easily calculated because the comparison is always done between a 2D constellation with size $2^{(2Q+1)/2}$ and that with size $2^Q$ (Q may not be an integer which facilitates much flexibility for comparison of the coded and un-coded cases because the constellation points are not confined to the power of 2. On the other hand, in DMT, if bit 1+bit 2−1 information bits are allocated to sub-channels 1 and 2 for transmission, two of the bit 1+bit 2−1 information bits are sent to the input of the convolutional encoder, and three bits are outputted from the encoder, which are then used to select 1 of an 8 4D subsets. The remaining information bits are used to select point in the 4D subset. Because bit 1+bit 2 are sent for the 2 sub-channels, it can be seen that the coding gain calculation will become difficult because bit 1 and bit 2 are always integers and may not be always equal, even though tone-ordering is utilized.

Other drawbacks exist in calculating of the bit error rate in DMT. Because two sub-channels constitute one 4D constellation, any error in one sub-channel will influence the errors in other sub-channels, DMT utilizes only one convolutional encoder across all the sub-channels in a one DMT symbol, essentially resulting in a time-varying encoder, because the constellation sizes vary from sub-channel to sub-channel. For instance, from any given time n to n+1, there may be 2 parallel transitions. But from time n+1 to n+2, there might be as much as 128 or more parallel transitions. Recalling that a first error event includes more than one branch metric difference in trellis coding, the error rate in one sub-channel is actually coupled to other sub-channels. From this point of view, equation (15) above, yields the direction and the best choice is of course $P_{b,DMT}=P_b$.

In addition, Wei only considered an infinite lattice and ignored the boundary effect. At the same time, he only paid attention to the kissing number (In geometry, the kissing number is the maximum number of spheres of radius 1 that can simultaneously touch a unit sphere in n-dimensional Euclidean space. The kissing number in n dimensions, with n=4, is 24) for the 4D symbol but not the bit error multiplicity, thus there are 24 such kissing numbers per 4D and each of them comes from the 4D symbol detection error at the intra-sub-lattice minimum squared Euclidean distance—MSED. However, in practice, not an infinite lattice, but a finite lattice is used to construct a 4D code. That means that the boundary effect must be considered, which turns out to be vital for DMT system design. On the other hand, it is the system bit error rate (related directly to the bit error multiplicity) that is of most interest, because it is this error rate that determines the final BER.

The boundary effect and the bit error multiplicity plays a very important role in determination of the performance for the case without Trellis-coded modulation (TCM). For the case with TCM, its role will be more interesting because in the coded case, a dense lattice $RD_4$ that is a rotated version of lattice $D_4$ is used, where the kissing number is 24 for $RD_4$ (per 4D). Therefore, a stronger impact of multiplicity (or error coefficient) on the performance for the coded case should be observed.

It is very hard to analyze the error performance in DMT with TCM due to the time-varying property and the coupling between different sub-channels. However, a general formula can be provided for the BER in a particular sub-channel from equation (10) as shown in equation (15) as follows:

$$P_b = P_{b,para} + P_{b,unpara} \quad (15)$$

where $P_{b,para}$ is bit error rate introduced by parallel branch in the trellis diagram which is dominated by the intra sub-lattice MSED or $d_{min}$ (the minimum squared distance for $RD_4$ in TCM in DMT is related to the un-coded minimum distance by $d_{min}^2 = 4d_1^2$). On the other hand, the second term $P_{b,unpara}$ in the right side is the bit error rate from the un-parallel transition, which is mainly contributed to the free distance $d_{free}$ of the trellis. In Wei's rate ⅔, 16 state Trellis code, this free distance is larger than the intra sub-lattice minimum MSED.

The first term in the right side of equation (16) below can be approximated by equation (14). The second term is bounded by:

$$P_{b,unpara} \leq \frac{1}{2b} Q(\sqrt{d_{free}^2 / 2N_0}) \exp(d_{free}^2 / 4N_0) \frac{\partial}{\partial Z} T(W, Z) \Big|_{Z=1, W=\exp(-1/4N_0)} \quad (16)$$

where T(W,Z) is a generating polynomial.

Due to the face that the convolutional encoder is being across all the sub-channels that are not with the same constellations, we must at least guarantee all the parallel paths have to have the same bit error rate along the Trellis. And because the free distance $d_{free}$ of the Trellis is larger than the minimum distance $d_{min}$ for lattice $RD_4$, and in DMT the SNR is normally high to keep the BER $P_b = 10^{-7}$, the contribution from $P_{b,unpara}$ is not considered.

Therefore, as in the un-coded case, it is the bit error multiplicity that determines the BER. For this reason, both the symbol and bit error multiplicities are shown in the table FIG. 7 for the final coding calculation. It should be noted that in real DMT system, even though tone ordering is offered, given the bits for first constituent sub-channel, the second sub-channel does not have the same constellation size in the same 4D symbol. To simplify the problem, the method and system of the present invention utilizes the same bits for both sub-channels in tabulating the table elements of FIG. 7.

The second column of the table is the average nearest neighbors for different bits/sub-channel. The number is normalized to per 2D constellation. It is clear that when the constellation size becomes large, the symbol error multiplicity (the kissing number) at MSED=16 ($d_1$=2) is clase to 12. On the other hand, in 4 QAM case, there is only 1 kissing number per 4D (instead of 24 for an infinite lattice). Actually, because one 4D symbol is composed of two 2D constellations (see FIGS. 3 and 4 for examples of 2D constellations) dividing the 4D symbol into 8 4D subsets will reveal the nearest neighbors.

A rule of thumb is that every doubling of the kissing number will cost a 0.2 dB SNR reduction so, a difference near 1 dB in the SNR required between $2^2$ and $2^{15}$ constellation points per sub-channel (per 2D) will be seen in terms of symbol error rate. Therefore, the boundary effect must be considered in the coded case for the coding gain calculation.

Several numerical examples may give us more insight about the boundary effect. For 2 bits/sub-channel, 4D point (0,0) has only 1 nearest neighbor (corresponds to 4 bits in difference with the neighbor). For 4 bits/sub-channel, 4D point (0,0) has 20 nearest neighbors (corresponds to 100 bits in difference). But 4D point (3,3) has only 8 neighbors in MSED (corresponds to 24 bits in difference). And for 5 bits/sub-channel, 4D point (0,0) has 24 nearest neighbors (the boundary effect is gone and there are 106 bits in difference with the neighbors). But 4D point (24, 24) has only 18 nearest neighbors. In any constellation, a real inner point will have a kissing number 24 but the outer points will never reach this number. The main difference between a small constellation and a large one is that the former has more percentage for the outer points and therefore the boundary effect is more obvious. For a single-carrier system, generally only one constellation is dealt with. But for a system like DMT, many QAM symbols join together and this big difference must be taken into consideration, especially for the case of TCM.

The third column in the table of FIG. 7 presents bit error multiplicity at the intra sub-lattice MSED. As the bits per sub-channel increase, the bit error coefficient for this sub-channel becomes large, which is in agreement with intuition because a large constellation means more average neighbors at MSED and small boundary effect.

Comparing the coded and un-coded cases, columns 5 and 6 give the same numbers as columns 2 and 3 for un-coded case. It can be seen that both the symbol and bit error multiplicities are much smaller for un-coded case due to the sparser lattice.

Particularly for DMT, and in reference to columns 4 and 7 of the table of FIG. 7, the method and system of the present invention tabulates the average error bits in one 2D symbol for both the coded and un-coded cases. It can be seen from the tabulated numbers that for the coded case, the number is between 3 to 7 but for the un-coded case, it is between 1 and 3, this indicates that if 1 2D symbol error is made, 3 to 7 bit errors will be generated for the coded case. However, there are only 1 to 3 bit errors per 2D symbol error for the un-coded case.

According to the relationship between the symbol error and bit error in the coded case, and the Viterbi decoding of Wei's 4D trellis code, when a decoder error is made, it is a 4D symbol error. Such an error may introduce at most 3 bit errors (recall that only 3 bits are coming out from the convolutional encoder for one 4D symbol, which select one of 8 4D sub-lattices).

But according to the method and system of the present invention, there may be a 4D symbol error without any coded bit error. A simple example is that a received 4D point is crossing the detection boundary in the same 4D sub-lattice, there will be un-coded bit errors but there is no coded bit error. The second column in the table of FIG. 8 is the SNR to support a certain constellation in the coded case, which is of course smaller than that for the un-coded case. The SNR for the un-coded case is the sum of column 2 and 3. The difference between the two is the nominal coding gain, which is offered in third column. As such, it can be seen that the coding gain in DMT is not a constant, as given in Wei's code.

$$C_{no\ min\ al} = 10 \log_{10}(d_{min}^2/d_1^2) = 6.0206 (dB) \quad (17)$$

Rather, it depends on the bits supported by the sub-channel (i.e. the constellation). The method and system of the present invention, and in reference to the table of FIG. 8, discloses that for DMT systems, due to the large error coefficient for a large constellation (say 11 bits/sub-channel), the coding gain is smaller compared to that of a small constellation (say, 2 bits/sub-channel), as shown in the tabulated coding of 6.0206 for 2 bits/sub-channel as compared to 5.3874 for 11 bits/sub-channel in column three of the table of FIG. 8. This nominal coding gain is achieved without considering the influence of the constellation expansion due to the trellis coding. By reducing the nominal coding gain by 1.5 dB, the effective coding gain is provided in column 4. For the 2 bits/sub-channel case, the result is the same as Wei's. However, for other bits/sub-channel, less coding gain is attained. The value off from 4.5206 dB (2 bits/sub-channel) is shown in the fifth column. It can be seen that at 15 bits/sub-channel, this difference is close to 0.62327 dB. Therefore, in the actual system implementation, this should also be considered (the actual number may change if the non-parallel paths are also put into consideration).

In literature, the rate supported by a given DMT system is calculated according to equation (3), with a fixed Trellis coding gain C as follows:

$$b_{DMT} = \sum_i b_i = \sum_i \log(1 + SNR_i C / M\Gamma) \quad (3)$$

where the summation is over all the sub-channels used M is the margin and $\Gamma$ is the gap. That is, for all the sub-channels used, the coding gain and the gap are common. But from the discussion above, the gap and the coding gain are both depending on the bits that the sub-channels can support. Therefore, to sustain a given bit error rate, we have to lose some SNR for some sub-channels with lower coding gain or a higher gap according to equation (3).

But from the discussion above, the method and system of the current invention has shown that due to the varying SNR GAP and the varying coding gain, the rate supported by a given DMT system may be calculated using equation (2) as follows:

$$b_{DMT} = \sum_i b_i = \sum_i \log(1 + SNR_i C_i / M\Gamma_i) \quad (2)$$

By utilizing the tabulated SNR GAP of the table of FIG. 6 and the tabulated SNR requirement for TCM of the table of FIG. 8 above, bits can be allocated to DMT sub-channels with greater efficiency resulting in a much better performance than the current bit-allocation methods and systems.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present inventions have been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present inventions as disclosed herein.

I claim:

1. A method performed in a DMT transceiver for loading bits into discrete multi-tone (DMT) sub-channels, the method comprising:
    computing signal-to-noise ratio ($SNR_i$) for all available sub-channels;
    computing a variable sub-channel coding gain according to an actual constellation size;
    computing a variable sub-channel signal-to-noise ratio gap (SNR-GAP) according to the actual constellation size;
    computing the number of bits to be allocated into each sub-channel;
    allocating bits to sub-channels based on an equal error rate.

2. The method of claim 1, wherein the total bits calculated for loading into all the sub-channels is computed using:

$$b = \sum_i \log(1 + SNR_i * C_i / M * \Gamma_i).$$

where b is the total bits, $SNR_i$ is the signal-to-noise ratio (SNR) in an $i^{th}$ sub-channel, C is a coding gain, M is a margin, and $\Gamma$ is an SNR gap.

3. The method of claim 1, wherein the probability of the symbol error is computed by:

$$P_s = K(i) * Q(d(i)/2\sigma)$$

where P is the probability, K(i) is a nearest symbol neighbor for an $i^{th}$ sub-channel, d(i) is a corresponding minimum distance, and $\sigma$ is a 1-dimensional Additive White Gaussian Noise (AWGN) standard deviation.

4. The method of claim 1, wherein the channel capacity is computed using:

$$b = \log_2(1 + SNR_c),$$

where $SNR_c$ is a received signal-to-noise ratio (SNR) per 2-dimensions.

5. The method of claim 1, wherein the real signal-to-noise ratio is computed by:

$$SNR_r = A[Q^{-1} * (P_b/K)]^2$$

where A is a number related to a size and shape of a constellation, $P_b$ is a required bit error rate, Q is an error function, and K is a nearest symbol neighbor.

6. The method of claim 1, wherein the signal-to-noise ratio gap (SNR GAP) for each sub-channel is computed using:

$$\Gamma = SNR_r - SNR_c.$$

where $SNR_r$ is a received signal-to-noise ratio (SNR) and $SNR_c$ is an actual SNR.

7. The method of claim 6, wherein the signal-to-noise ratio gap (SNR GAP) for each sub-channel is used to estimate the difference between the channel capacity and actual signal-to-noise ratio.

8. A system for loading bits into discrete multi-tone (DMT) sub-channels, the system comprising a DMT transceiver adapted to
    compute a signal-to-noise ratio ($SNR_i$) for all available sub-channels;
    compute a variable sub-channel coding gain according to an actual constellation size;
    compute a variable sub-channel signal-to-noise ratio gap (SNR-GAP) according to the actual constellation size;
    compute the number of bits to be allocated into each sub-channel; and
    allocate bits to sub-channels based on an equal error rate.

9. The system of claim 8, wherein the total bits calculated for loading into all the sub-channels is computed using:

$$b = \sum_i \log(1 + SNR_i * C_i / M * \Gamma_i).$$

where b is the total bits, $SNR_i$ is the signal-to-noise ratio (SNR) in an $i^{th}$ sub-channel, C is a coding gain, M is a margin, and $\Gamma$ is an SNR gap.

10. The system of claim 8, wherein the probability of the symbol error is computed by:

$$P_s = K(i) * Q(d(i)/2\sigma).$$

where P is the probability, K(i) is a nearest symbol neighbor for an $i^{th}$ sub-channel, d(i) is a corresponding minimum distance, and $\sigma$ is a 1-dimensional Additive White Gaussian Noise (AWGN) standard deviation.

11. The system of claim 8, wherein the channel capacity is computed using:

$$b = \log_2(1 + SNR_c).$$

where $SNR_c$ is a received signal-to-noise ratio (SNR) per 2-dimensions.

12. The system of claim 8, wherein the real signal-to-noise ratio is computed by:

$$SNR_r = A[Q^{-1}*(P_b/K)]^2.$$

where A is a number related to a size and shape of a constellation, $P_b$ is a required bit error rate, Q is an error function, and K is a nearest symbol neighbor.

13. The system of claim 8, wherein the signal-to-noise ratio gap (SNR GAP) for each sub-channel is computed using:

$$\Gamma = SNR_r - SNR_c,$$

where $SNR_r$ is a received signal-to-noise ratio (SNR) and $SNR_c$ is an actual SNR.

14. The system of claim 13, wherein the signal-to-noise ratio gap (SNR GAP) for each sub-channel is used to estimate the difference between the channel capacity and actual signal-to-noise ratio.

15. A method for bit loading performed in a DMT transceiver based on an equal error rate principle for each sub-channel comprising:
   computing a signal-to-noise ratio ($SNR_i$) for all available sub-channels;
   computing a variable sub-channel coding gain according to an actual constellation size;
   computing a variable sub-channel signal-to-noise ratio gap (SNR-GAP) according to the actual constellation size;
   computing the number of bits to be allocated into each sub-channel; and allocating bits to sub-channels based on an equal error rate.

16. The method of claim 15, wherein the actual constellation size varies from 1 to 15 bits per sub-channel.

17. The method of claim 15, wherein the signal-to-noise ratio gap (SNR GAP) for each sub-channel is used to estimate a difference between channel capacity and an actual capacity usage.

18. The method of claim 17, wherein computing the variable SNR-GAP depends on a shape and number of bits allocated to each sub-channel.

19. The method of claim 18, further comprising tabulating different SNR-GAP values for different sub-channels.

20. The method of claim 19, wherein tabulating different SNR-GAP values further comprises constructing a look-up table for the SNR-GAP with different bits.

* * * * *

UNITED STATES PATENT AND TRADEMARK OFFICE
CERTIFICATE OF CORRECTION

PATENT NO. : 7,653,139 B2
APPLICATION NO. : 11/315372
DATED : January 26, 2010
INVENTOR(S) : Linlin Li Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1068 days.

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,653,139 B2  
APPLICATION NO. : 11/315372  
DATED : January 26, 2010  
INVENTOR(S) : Linlin Li Page 1 of 1

It is certified that error appears in the above-identified patent and that said Letters Patent is hereby corrected as shown below:

Column 12, line 18, claim 2, after the equation remove ".".  
Column 12, line 36, claim 4, after the equation remove ",".  
Column 12, line 47, claim 6, after the equation remove ".".  
Column 13, line 5, claim 9, after the equation remove ".".  
Column 13, line 14, claim 10, after the equation remove ".".  
Column 13, line 23, claim 11, after the equation remove ".".  
Column 13, line 27, claim 12, after the equation remove ".".  
Column 13, line 35, claim 13, after the equation remove ",".

Signed and Sealed this  
Fourth Day of October, 2011

David J. Kappos  
*Director of the United States Patent and Trademark Office*